United States Patent [19]

Monteiro et al.

[11] Patent Number: 5,330,801
[45] Date of Patent: Jul. 19, 1994

[54] PROCESS FOR TINNING ELECTRICALLY CONDUCTIVE WIRE

[75] Inventors: Anthony M. Monteiro, Holyoke, Mass.; Stephen M. Hilliard, Vernon; Ralph L. Ferraro, Sandy Hook, both of Conn.

[73] Assignee: United Technologies Corporation, Hartford, Conn.

[21] Appl. No.: 789,667

[22] Filed: May 8, 1991

Related U.S. Application Data

[63] Continuation-in-part of Ser. No. 494,635, Mar. 16, 1990, abandoned.

[51] Int. Cl.⁵ .................... B05D 3/12; B05D 5/12; B05D 1/18; B05D 3/10
[52] U.S. Cl. .................... 427/560; 427/600; 427/123; 427/310; 427/313; 427/405; 427/433
[58] Field of Search .............. 427/57, 123, 310, 311, 427/312, 405, 433, 600, 560, 313

[56] References Cited

U.S. PATENT DOCUMENTS

| | | | |
|---|---|---|---|
| 2,007,221 | 7/1935 | Smith | 427/313 |
| 2,824,543 | 2/1958 | Brown | 427/57 |
| 3,912,544 | 10/1975 | Sabatino | 427/312 |
| 4,307,128 | 12/1981 | Nagano et al. | 427/57 |
| 4,709,849 | 12/1987 | Socolowski | 228/56.3 |
| 5,075,258 | 12/1991 | Carney et al. | 427/433 |

OTHER PUBLICATIONS

Method 208E Solderability pp. 2630-2647, Apr. 1, 1980.

*Primary Examiner*—Marianne Padgett

[57] ABSTRACT

A process for tinning plated wire involves first the placing of the wire in a suitable chemical flux for a period of time, the wire is then immersed for a period of time into a static solder pot having molten solder therein, the wire is then re-immersed into the chemical flux for a period of time, and finally the wire is immersed for a period of time into an ultrasonic solder pot having molten solder therein, the wire when removed from the ultrasonic pot being sufficiently tinned such that the solder has formed a suitable intermolecular bond to the plating in accordance with typical bonding criteria.

19 Claims, 1 Drawing Sheet

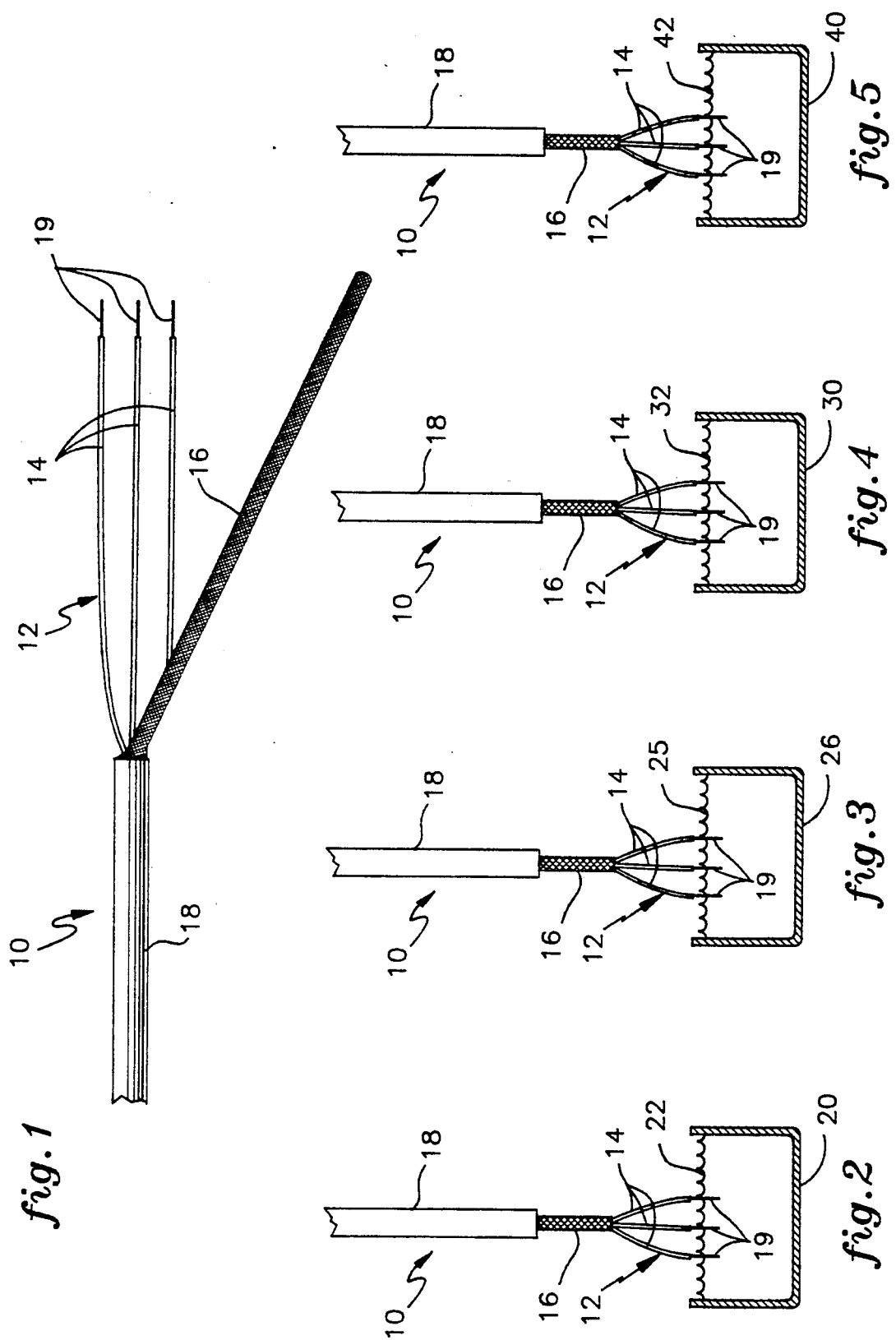

PROCESS FOR TINNING ELECTRICALLY CONDUCTIVE WIRE

This invention is a continuation-in-part of 07/454,635 filed on Mar. 16, 1990, now abandoned.

TECHNICAL FIELD

This invention relates to soldering, and more particularly to a method of applying solder to electrically conductive.

BACKGROUND ART

Copper wire used in electronic applications is sometimes plated to protect the copper wire from corrosion. However, the plating material (e.g., nickel) will not easily form a proper intermolecular bond with solder, e.g., tin/lead type S, composition Sn60 or Sn63.

Criteria for acceptable bonding of the solder to the wire are set out in MIL-STD-202 Method 208, paragraph 4.6. Also set forth, in paragraphs 4.4 and 4.5, is a procedure for applying flux and solder to the wire. The procedure involves preparing the wire for subsequent solder application by cleaning the wire with a chemical flux, e.g., a rosin base flux (paragraph 4.4). The flux-treated wire is then immersed in a static solder pot containing molten solder (paragraph 4.5). In the case of plated wire, however, this method may not allow for proper cleaning of the plating, which, in turn, may not allow the solder to properly wet the wire. This problem is particularly pronounced with nickel plated wire. Wetting refers to the formation on the plating of a relatively uniform, smooth, unbroken and adherent film of solder.

An alternative method for bonding the solder to the wire involves the single step of immersing the wire in an ultrasonic solder pot, as disclosed in U.S. Pat. No. 3,912,544 to Sabatino, issued Oct. 14, 1975. The ultrasonic agitation improves the intermolecular bonding process over that of the static solder pot. In this process, the wire is immersed in the pot without having been first immersed in flux. However, manufacturers of ultrasonic pots recommend against placing wire with flux chemical thereon into the pot due to the fact that the flux may corrode the pot and cause its premature failure. Also, this ultrasonic process has been found unacceptable in meeting the solderability criteria of MIL-STD-202 Method 208, paragraph 4.6.

DISCLOSURE OF INVENTION

Objects of the present invention include the provision of a quick and easy process for coating electrically conductive with solder wire which ensures the proper wetting of the solder to the plating, as specified by typical solderability requirements, e.g., MIL-STD-202 Method 208, paragraph 4.6.

This invention is predicated on the fact that the immersion of a portion of the wire into chemical flux and then into an ultrasonic solder pot containing molten solder allows for proper intermolecular bonding of the solder to the plating, notwithstanding the fact that manufacturers of ultrasonic pots recommend against the placing of nickel plated wire with a chemical flux applied thereto into the ultrasonic pot since the flux may corrode the pot and cause premature failure thereof.

According to the present invention, a process for coating electrically conductive with solder plated wire involves first the placing of the wire in a suitable chemical flux for a period of time, the wire is then immersed for a period of time into a static solder pot having molten solder therein, the wire is then re-immersed into a chemical flux for a period of time, and finally the wire is immersed for a period of time into an ultrasonic solder pot having molten solder therein, the wire when removed from the ultrasonic pot being sufficiently coated such that the solder has formed a suitable intermolecular bond to the plating in accordance with typical bonding criteria.

The invention has utility in providing a quick and easy method of coating plated wire with solder. The method is time efficient, especially in a high volume electronic production area where a large number of wires must be coated with solder before being soldered into, e.g., printed circuit boards or terminal connectors. The method also ensures that typical high standards for solderability are met, such as those found in MIL-STD-202 Method 208, paragraph 4.6.

Other objects, features, and advantages of the present invention will become more apparent from the following detailed description of a best mode embodiment thereof, as illustrated in the accompanying drawings.

BRIEF DESCRIPTION OF DRAWINGS

FIG. 1 illustrates a portion of a wire having exposed plated wire conductors;

FIG. 2 illustrates the conductors of FIG. 1 as immersed into chemical flux;

FIG. 3 illustrates the conductors of FIG. 1 as immersed into a static pot having molten solder therein;

FIG. 4 illustrates the conductors of FIG. 1 as immersed into an ultrasonically agitated solder pot having molten solder therein; and FIG. 5 illustrates the conductors of FIG. 1 as immersed into an ultrasonic cleaner.

BEST MODE FOR CARRYING OUT THE INVENTION

Referring to FIG. 1, electrically conductive plated wire 10 [i typically comprises multiple copper conductors 12 of varying diameter. The plating material may be selected from elements in Group VA, VIA, VIIA, VIII, IB, and IIB on the periodic table. A partial list of elements from these groups which may form a suitable bond to plate the copper conductors includes: zinc, nickel, cobalt, iron, manganese, and chromium. An example of a suitable multi-stranded nickel plated wire is that provided by Raychem and designed to meet the MIL-W-22759/45A or MIL-W-22759/46A military standards. Each conductor is insulated with, e.g., a Flouropolymer insulating material 14. The wire oftentimes has a metallic braid 16 surrounding all of the conductors 12 for shielding. Finally, an outer jacket 18, comprised of a similar Flouropolymer insulating material, encloses the metal braid 16.

In preparation for the method of the present invention, a portion of the insulation 14 is removed from an end of each conductor 12 using suitable wire strippers, e.g., mechanical-type wire strippers, Model Stripmaster L5217, provided by Ideal Industries, Inc., or thermal-type wire strippers, Model Stripall TC-1, provided by Teledyne Kinetics.

The strippers are used to cut the insulation and pull the cut portion 1/16 to ⅛ of an inch away from the remainder of the insulation. The strippers are then removed from the conductor 12 and the cut portion of the insulation is removed by hand, being gently pulled and twisted in the same direction that the conductor strands are wound. FIG. 1 illustrates the wire 10 with a portion of the insulation 14 removed from each of the conductors 14, thereby exposing a portion 19 of the nickel plated copper wire. Also, the braid 16 is illustrated as located off to one side. If desired, the braid may be cut off at the point where the outer jacket 18 begins.

Next, the exposed portion 19 of each conductor is scrubbed with a clean nylon fiber brush together with isopropyl alcohol, which may typically conform to Federal Specification TT-I-735 or equivalent. After scrubbing, the conductor is visually inspected using a 10X power magnification to ensure that there are no signs of exposed copper, an unacceptable condition.

At this time, an ultrasonic solder pot and, as described hereinafter, possibly a static solder pot are each filled to an appropriate level with a suitable solder. The ultrasonic pot may typically comprise the Model TP-3D provided by Blackstone, and be capable of holding at least two pounds of solder and capable of ultrasonic agitation at 21 KHz +/− 10%. The pot should also maintain a solder temperature between 510 and 530 degrees F. The static solder pot may have similar characteristics. The solder itself may, if desired, comprise a tin, tin-lead, or lead alloy type solder, type S, composition Sn60 or Sn63, as specified by QQ-S-571E, May 5, 1972, Amendment 4, Jan. 4, 1980. However, it should be noted that any solder may be used as long as the solder temperature is appropriately set and maintained.

Once this preparation phase is complete, solder is applied to the conductors are in accordance with the present invention. Referring to FIG. 2, as a first step, the exposed conductor portions 19 are immersed in a container 20 having a suitable rosin/activated (RA) or rosin/mildly activated (RMA) chemical flux 22 therein. The flux 22 may conform to MIL-F-14256D, Apr. 17, 1972, Amendment 2. The exposed conductor portions 19 are immersed in the flux to within 0.05 inch of the wire insulation 14 for a period of from five to ten seconds. In this step, preferably an RA flux is used. The exposed conductor portions are then removed from the flux and allowed to drain for ten to sixty seconds.

Referring to FIG. 3, the dross (i.e., the burnt solder scum) on the surface of the molten solder 25 in a solder pot 26 should be removed using, e.g., a stainless steel spatula, each time immediately before the exposed conductor portions are immersed into the molten solder. This is usually required since the dross will typically adhere to the conductor instead of the molten solder, an undesirable condition. Next, the molten solder 25 is stirred in the pot 26 with, e.g., a clean stainless steel paddle to help maintain the solder at a uniform temperature.

After removing the dross, the exposed conductor portions are immersed into the solder pot 26 having molten solder therein and with the ultrasonic agitation turned off (i.e., a static dip). Since no ultrasonic agitation is required in this step, a static pot may be used, if desired, instead of an ultrasonic pot. Since an ultrasonic pot is required for a later step in the method of the present invention, the use of a static pot in the present step may ultimately prolong the life of the ultrasonic pot, due to the harmful effects of the rosin flux thereon. The exposed conductor portions 19 are immersed in the molten solder 25 no closer than 0.05 inch from the insulation 14 for a period of from five to six seconds. The wire is then removed from the solder pot and allowed to cool for a minimum of twenty seconds.

The exposed conductor portion may then be scrubbed using a clean nylon brush together with isopropyl alcohol. Next, the exposed conductor portions are immersed again into the flux 22 (FIG. 2), to within 0.05 inch of the insulation 14, for a period of from five to ten seconds. An RMA flux may be used in this step to reduce corrosion. Finally, the exposed conductor portions are removed from the flux and allowed to drain for ten to sixty seconds.

Referring to FIG. 4, the dross is removed from the surface of an ultrasonic solder pot 30 having molten solder 32 therein. The exposed conductor portions 19 are immersed in the pot, with the ultrasonic agitation operational, for a period of from five to six seconds. The use of ultrasonic agitation tends to activate the solder molecules, which, in turn, causes the solder to properly adhere to the plating on the conductors. The exposed conductor portions are immersed no closer than 0.05 inch from the insulation. The exposed conductor portions are then removed from the solder and allowed to cool for twenty seconds minimum. At this point, the exposed conductor portions are coated with solder in accordance with a broadest scope of the present invention. After this step, the dross should be removed from the surface of the molten solder 32 in the ultrasonic pot 30.

The exposed conductor portions may then be scrubbed using a clean nylon fiber brush and isopropyl alcohol, and then scrubbed with a clean nylon fiber brush and warm (100 to 120 degrees F.) distilled water. Next, the exposed conductor portions may be immersed into isopropyl alcohol, 0.5 inches above the insulation 14, for 2 +/− 0.5 minutes.

Referring to FIG. 5, the exposed conductor portions 19 are immersed, 0.5 inches above the insulation, into an ultrasonic cleaner 40 (e.g., a jewelry cleaner), filled with Freon 42 of a type as specified per MIL-C-81302D Type II or equivalent. As an alternative, manual scrubbing with a clean nylon fiber brush and Freon may be performed.

Following the Freon cleaning, the wire 10 is baked at 130 +/− 5 degrees F. for 15 +/− 1 minutes. Finally, the exposed conductor portions are inspected, using 10X magnification, to ensure that all flux residue has been removed therefrom. The exposed conductor portions are then evaluated for proper wetability according to, e.g., MIL-STD-202 Method 208, paragraph 4.6. This standard also provides photographic figures to aid in the evaluation of proper wetability.

Upon satisfactory evaluation the wire is now ready to be soldered into a printed circuit board or terminal connector.

The method of the present invention, as disclosed hereinafter, of applying solder to a plated wire meets or exceeds typical solderability requirements, e.g., paragraph 4.6 of MIL-STD-202 Method 208, all of Method 208 being hereby incorporated by reference. This standard represents typical criteria to be met by applicable parties in developing products for the United States Government. However, the method of the present invention may be used by interested parties not bound by contract to such high standards, but who are nevertheless interested in assuring high quality in the solderability of solder to plated wire.

A number of optional steps related to the cleaning of the exposed conductor portions have been disclosed. However, it suffices for the broadest scope of the method of the present invention that the exposed ends of the plated wire conductors are immersed first in the flux for a period of time, then immersed for a period of time into a static solder pot having molten solder therein, then re-immersed into a flux for a period of time, and finally immersed for a period of time into an ultrasonic solder pot having molten solder therein, the wire when removed from the ultrasonic pot being sufficiently coated such that the solder has formed a suitable intermolecular bond to the plating in accordance with typical bonding criteria.

Although the invention has been shown and described with respect to a best mode embodiments thereof, it will be understood by those skilled in the art that the foregoing and various other changes, omissions, and addition in the form and detail thereof may be made without departing from the spirit and scope of the claimed invention.

We claim:

1. A method of applying solder to a nickel plated wire, comprising the steps
   firstly, immersing the wire in a chemical flux for a period of time;
   next, immersing the wire for a period of time into a static solder pot having molten solder therein and with no ultrasonic agitation operational;
   next, immersing the wire into a chemical flux for a period of time; and
   immersing the wire for a period of time into an ultrasonic solder pot having molten solder therein and with ultrasonic agitation operational, the wire when removed from the ultrasonic solder pot being sufficiently coated with the molten solder such that the solder has formed a suitable intermolecular bond to the nickel plating.

2. The method of claim 1, further comprising the step of:
   removing any insulation surrounding a portion of a length of the wire, said portion being that to which the solder is applied thereto, said step of removing said insulation occurring prior to said step of firstly immersing the wire in said chemical flux for a period of time.

3. The method of claim 1, further comprising the step of:
   removing any dross from the surface of said molten solder in said static solder pot prior to said step of immersing the wire for a period of time into said static solder pot.

4. The method of claim 1, further comprising the step of:
   removing any dross from the surface of said molten solder in said ultrasonic solder pot prior to said step of immersing the wire for a period of time into said ultrasonic solder pot.

5. The method of claim 1, further comprising the step of:
   cleaning the wire following said step of immersing the wire for a period of time into said static solder pot having molten solder therein.

6. The method of claim 5, wherein said step of cleaning the wire comprises the step of scrubbing the wire with a suitable cleaning agent.

7. The method of claim 1, further comprising the step of:
   cleaning the wire following said step of immersing the wire for a period of time into said ultrasonic solder pot having molten solder therein.

8. The method of claim 7, wherein said step of cleaning the wire comprises the step of scrubbing the wire with a suitable cleaning agent.

9. The method of claim 1, further comprising the step of:
   ultrasonically cleaning the wire, following said step of immersing the wire for a period of time into said ultrasonic solder pot, by immersing the wire into an ultrasonic cleaner having a suitable cleaning agent therein.

10. A method of applying solder to a nickel plated wire conductor, comprising the steps of:
    firstly, immersing a portion of the conductor in a chemical flux for a period of time;
    next, immersing the conductor portion for a period of time into a static solder pot having molten solder therein and with no ultrasonic agitation operational;
    next, immersing the conductor portion into a chemical flux for a period of time; and
    immersing the conductor portion for a period of time into an ultrasonic solder pot having molten solder therein and with ultrasonic agitation operational, the conductor portion when removed from the ultrasonic solder pot being sufficiently coated with the molten solder such that the solder when cooled has formed a suitable intermolecular bond to the plating.

11. The method of claim 10, wherein said plated wire conductor is a nickel plated wire conductor.

12. The method of claim 11, further comprising the step of:
    removing any insulation surrounding the conductor portion prior to said step of firstly immersing the conductor portion in said chemical flux for a period of time.

13. The method of claim 11, further comprising the step of:
    removing any dross from the surface of said molten solder in said static solder pot prior to said step of immersing the conductor portion into said static solder pot.

14. The method of claim 11, further comprising the step of:
    removing any dross from the surface of said molten solder in said ultrasonic solder pot prior to said step of immersing the conductor portion into said ultrasonic solder pot.

15. The method of claim 11, further comprising the step of:
    cleaning the conductor portion following said step of immersing the conductor portion into said static solder pot.

16. The method of claim 15, wherein said step of cleaning the conductor portion comprises the step of scrubbing the conductor portion with a suitable cleaning agent.

17. The method of claim 11, further comprising the step of:
    cleaning the conductor portion following said step of immersing the conductor portion into said ultrasonic solder pot.

18. The method of claim 17, wherein said step of cleaning the conductor portion comprises the step of scrubbing the conductor portion with a suitable cleaning agent.

19. The method of claim 11, further comprising the step of:
    ultrasonically cleaning the conductor portion, following said step of immersing the conductor portion into said ultrasonic solder pot, by immersing the conductor portion into an ultrasonic cleaner having a suitable cleaning agent therein.

* * * * *